(No Model.)
M. A. LASKA.
COFFEE ROASTER.
No. 340,328. Patented Apr. 20, 1886.
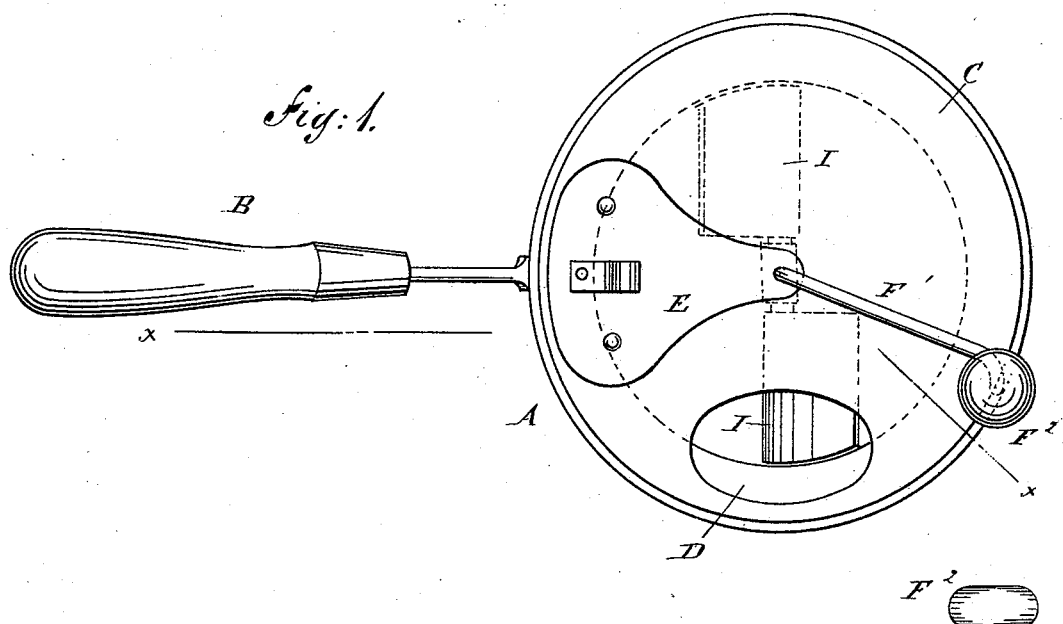
Fig: 1.
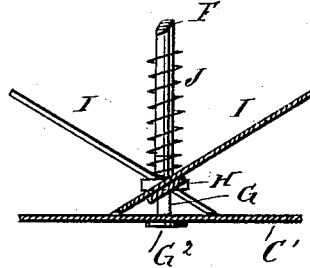
Fig: 3.
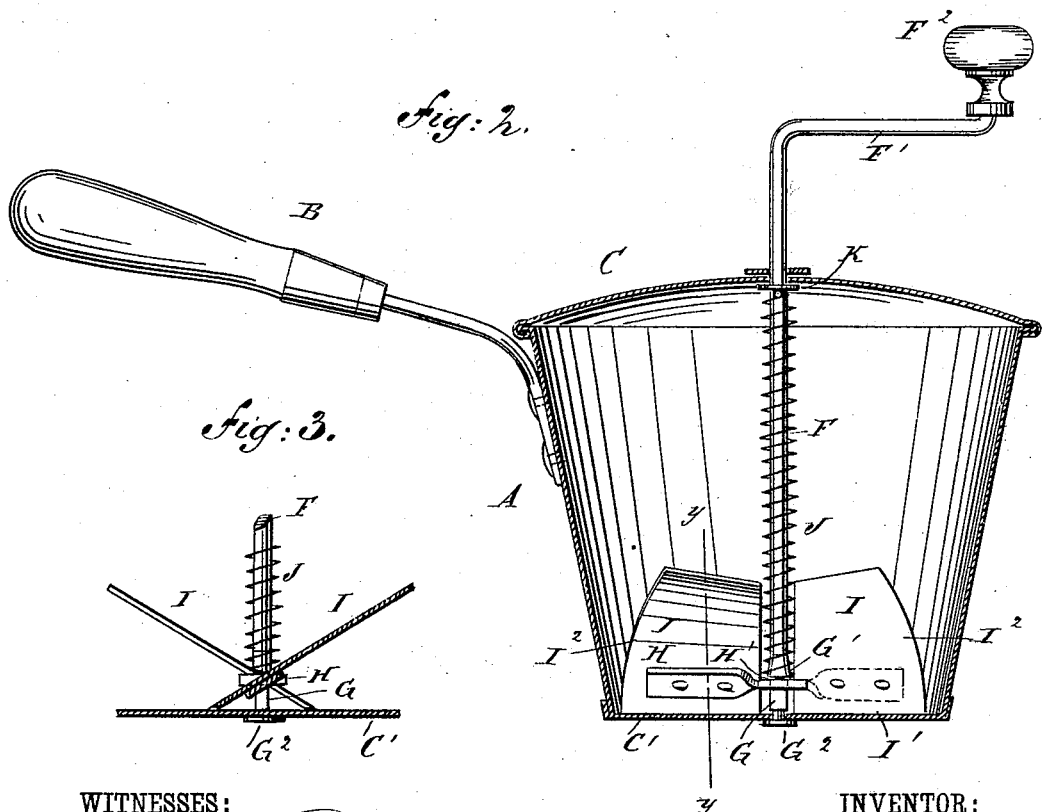
Fig: 2.
WITNESSES:
Chas. Nida
C. Sedgwick
INVENTOR:
M. A. Laska
BY Munn & Co.
ATTORNEYS.

UNITED STATES PATENT OFFICE.

MATHIAS A. LASKA, OF NEW ORLEANS, LOUISIANA.

COFFEE-ROASTER.

SPECIFICATION forming part of Letters Patent No. 340,328, dated April 20, 1886.

Application filed March 11, 1886. Serial No. 194,838. (No model.)

*To all whom it may concern:*

Be it known that I, MATHIAS A. LASKA, of the city of New Orleans, in the parish of Orleans and State of Louisiana, have invented a new and Improved Coffee-Roaster, of which the following is a full, clear, and exact description.

The object of my invention is to provide a new and improved coffee-roaster which prevents the coffee-beans from clogging up the stirring arms or blades, and also roasts the same equally and effectually.

The invention consists of stirring arms or blades placed loosely on the revolving shaft and held in contact on the bottom of the roasting-pan by a spiral spring.

The invention also consists in various parts and details and combinations of the same, hereinafter more fully described, and pointed out in the claims.

Reference is to be had to the accompanying drawings, forming a part of this specification, in which similar letters of reference indicate corresponding parts in all the figures.

Figure 1 is a plan view of my improved coffee-roaster. Fig. 2 is a sectional elevation of the same on the line $xx$ of Fig. 1, and Fig. 3 is a detail sectional elevation on the line $yy$ of Fig. 2.

The roasting-pan A is provided with a handle, B, and a cover, C, having an aperture, D, which can be covered by a pivoted lid, E. A vertical shaft, F, is placed in the center of the roasting-pan A, and mounted to turn in bearings on the cover C and the bottom C' of the pan A. The shaft F extends beyond the cover C, and then is formed into a horizontal arm, F', provided on its end with a knob or handle, F². The lower end of the shaft F is squared, as at G, so as to form a shoulder, G', on the shaft F. The extreme lower end of the shaft F passes through the bottom C' of the pan A, and is formed on the under side of the said bottom with a head, G², which prevents an upward movement of the shaft F. A cross-plate, H, having an oblong aperture, H', through which passes the squared part G of the shaft F, is provided on each side of the shaft F with a stirring-plate, I, riveted or otherwise fastened to the cross-plate H. The stirring-plates I are placed at angles to each other, as seen in Fig. 3, and each has a straight bottom edge, I', in contact with the bottom of the pan A, and a curved outer edge, I². A spiral spring, J, is coiled around the shaft F, and presses on its lower end on the cross-plate H, and rests on its upper end against the under side of a collar, K, secured to the shaft F immediately below the cover C.

The operation is as follows: The coffee-beans are placed into the pan A through the aperture D in the cover C, which aperture is then closed by the lid E. The pan A is then placed over a fire in a stove, and the shaft F is revolved by the turning of the knob or handle F². The revolution of the shaft F imparts a rotary motion to the cross-plate H and the stirring arms or blades I, the straight lower edges I' of which are held in constant contact with the bottom C' of the pan A by the pressure of the spiral spring J on the cross-plate H. The beans can be examined at any time through the aperture D by removing the cover E.

It will be seen that the coffee-beans are constantly agitated by the revolution of the stirring-plates I, which also prevent the coffee-beans from remaining long on the bottom C' of the pan A, and also prevent the same from getting between the straight lower edges of the blades I and the bottom C' by the action of the spiral spring J on the cross-plates H, whereby the coffee-beans are equally and very effectually roasted.

Having thus fully described my invention, what I claim as new, and desire to secure by Letters Patent, is—

1. In a coffee-roaster, the combination of a roasting-pan with a shaft, a spiral spring, and stirring arms or blades held in contact with the bottom of the roasting-pan by the said spiral spring, substantially as shown and described.

2. In a coffee-roaster, the combination of a roasting-pan and a shaft, having a squared part near its lower end, with a cross-plate provided with stirring arms or plates set at angles to each other and having a straight lower edge, and a spiral spring coiled on the said shaft and holding the said lower edges of the stirring arms or plates in contact with the bottom of the roasting-pan, substantially as shown and described.

3. In a coffee-roaster, the pan A and the shaft F, provided with the squared part G, the head G², and the collar K, in combination with the cross-plate H, the stirring-plates I, and the spiral spring J, substantially as shown and described.

MATHIAS A. LASKA.

Witnesses:
 THEODOR VOIGT,
 EDU. DE ARMOR.